June 29, 1926.
J. V. GIESLER
1,590,237
METHOD OF MAKING TUBULAR CORRUGATED WALLS
Original Filed Sept. 13, 1921    3 Sheets-Sheet 1
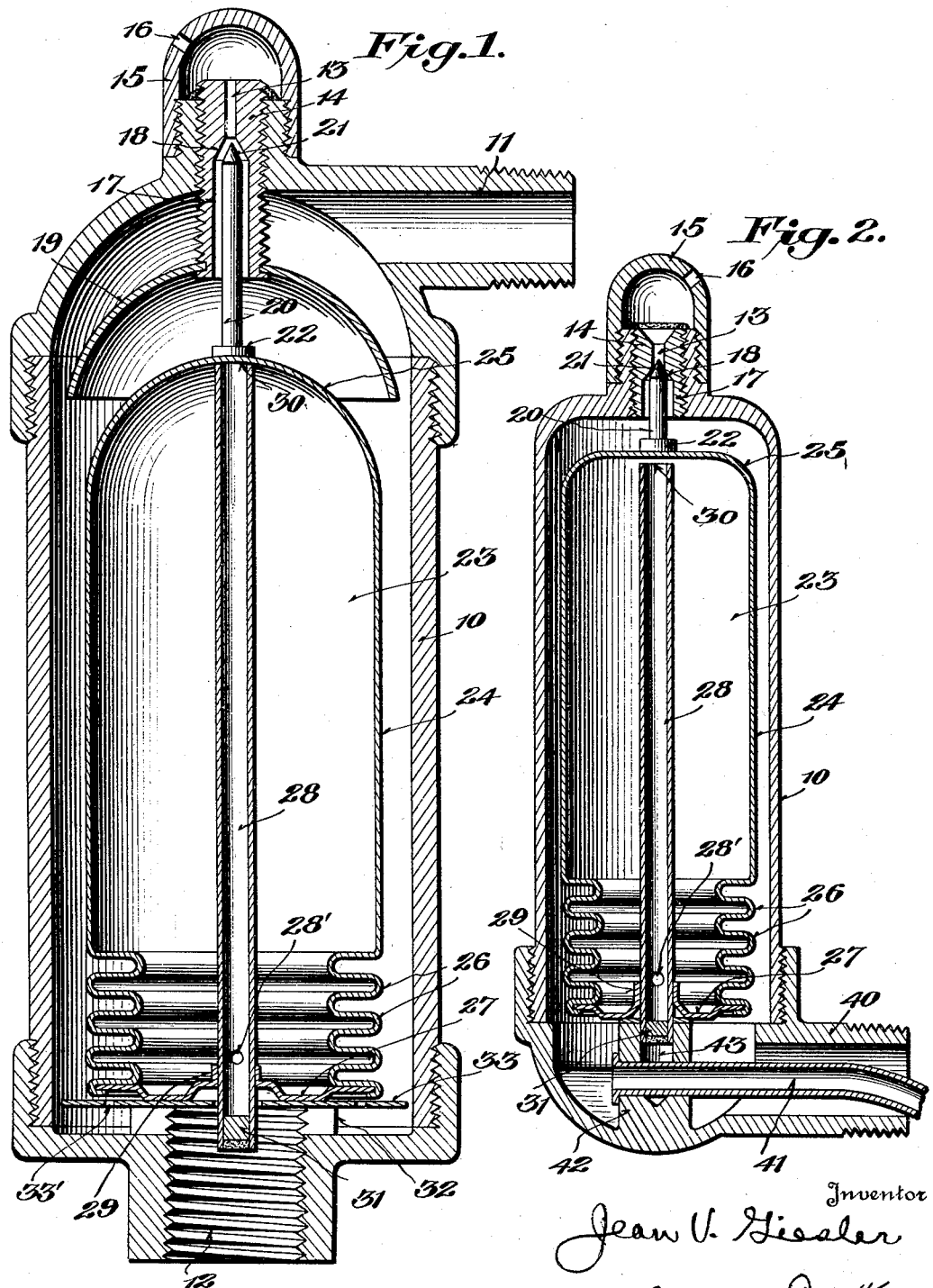

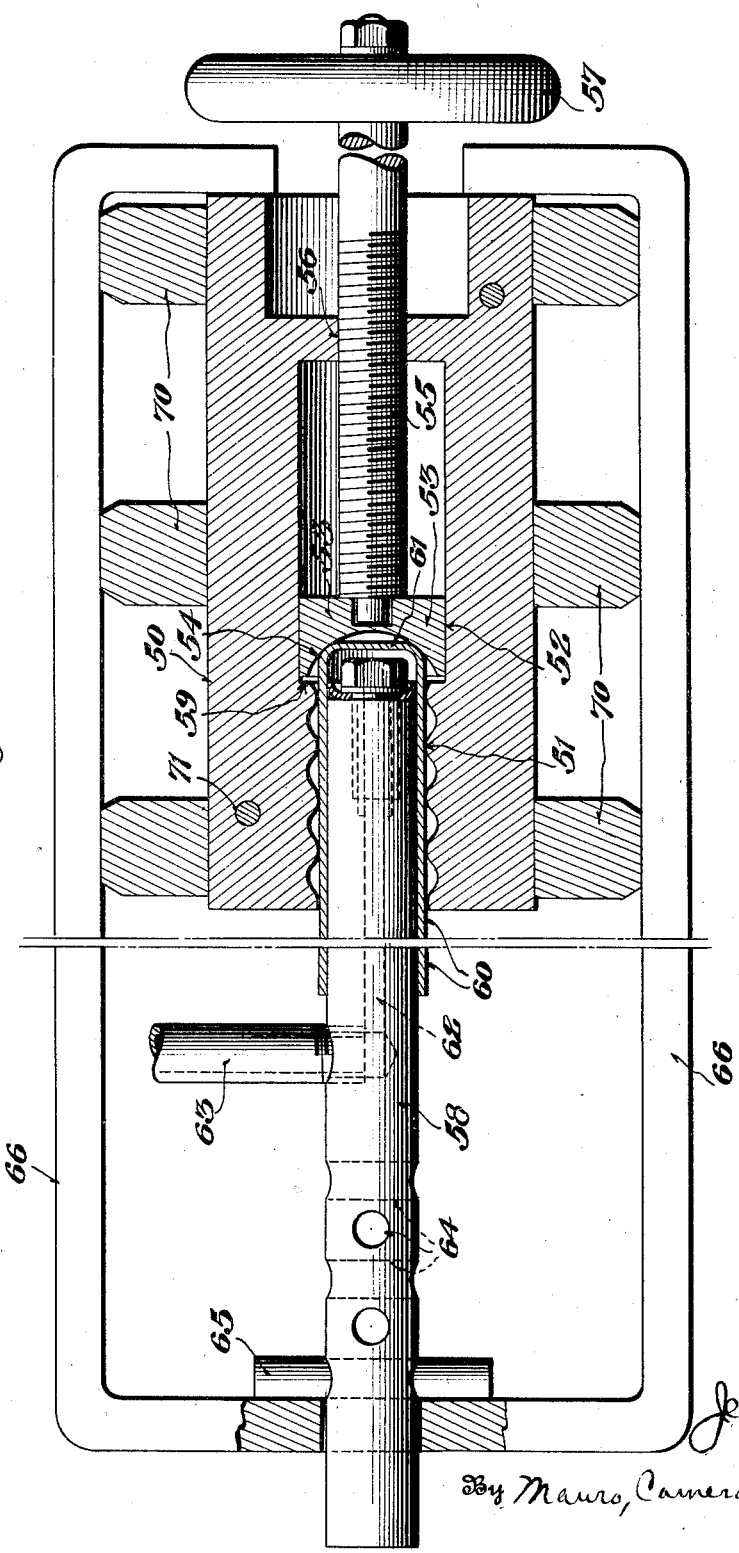

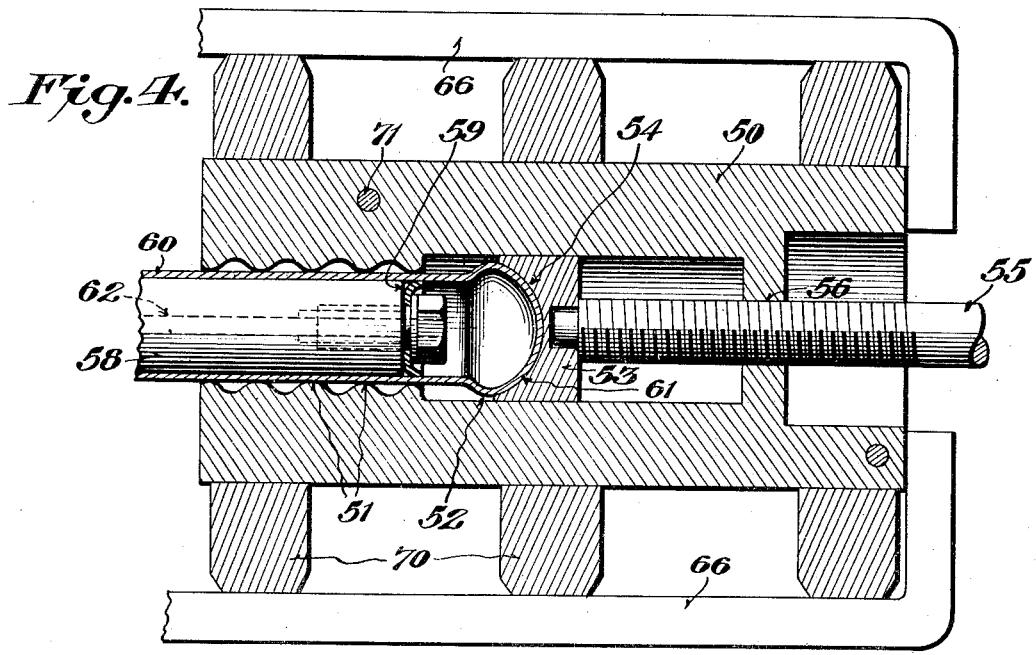
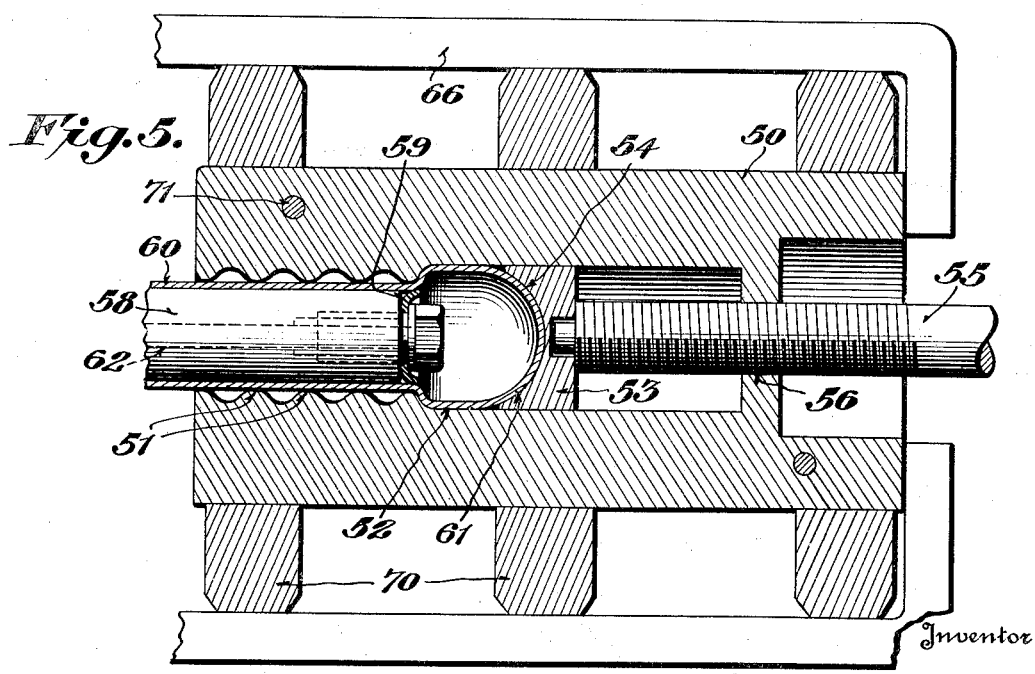

Patented June 29, 1926.

1,590,237

UNITED STATES PATENT OFFICE.

JEAN V. GIESLER, OF KNOXVILLE, TENNESSEE, ASSIGNOR TO THE FULTON COMPANY, OF KNOXVILLE, TENNESSEE, A CORPORATION OF MAINE.

METHOD OF MAKING TUBULAR CORRUGATED WALLS.

Original application filed September 13, 1921, Serial No. 500,336. Divided and this application filed December 8, 1924. Serial No. 754,623.

This invention relates to combined floats and thermostats and, while applicable to a variety of devices, has special reference to combined floats and thermostats for controlling an air valve, such as is commonly applied to a steam radiator to permit the escape of air but prevent the escape of steam or water. The present application is a division of my application for "Combined float and thermostat", Serial No. 500,336, filed September 13, 1921.

Heretofore air valves of this character have been commonly provided with separate float and thermostatic elements which, in some cases, have been connected to form a unit. Devices of this character, however, have the serious objection that they are more or less complicated in construction and expensive to manufacture and the use of separate float and thermostatic elements frequently entails the consumption of so much space as to render use of the device impractical.

To overcome the disadvantages incident to the provision of separate float and thermostatic elements, it has been suggested to provide a combined float and thermostat by constructing a buoyant element of material which will expand and contract in response to temperature variations to actuate the valve member. Devices of this character, however, have not proved satisfactory for a number of reasons, among the more important of which is the relatively great sluggishness or thermostatic lag incident to the operation of an element which depends upon volumetric or linear expansion to effect the opening and closing of a valve.

It has also been proposed to provide a combined float and thermostat in the form of a hollow buoyant body having a diaphragm soldered or brazed into one end thereof and charged with a volatile fluid which, by change of vapor tension when subjected to the temperature of steam, will flex said diaphragm and actuate the valve member. Devices of this character have also proved unsatisfactory for a number of reasons, among the more important of which is the fact that the flexure of said diaphragm necessarily produces repeated and oppositely-directed stresses at the soldered or brazed joint, so that said joint opens after a short period of use with the consequent leakage of the volatile fluid and inoperativeness of the device.

It is an object of this invention to provide a combined float and thermostat, particularly designed for controlling an air valve, which employs an expansible and contractible hollow buoyant member having a flexible wall while avoiding the danger of rupture and leakage incident to flexure at a soldered or brazed joint.

Another object of this invention is to provide a device of the type characterized which is possessed of relatively great buoyancy for the space which it occupies. Another object of this invention is to provide a device of the type characterized wherein the hollow buoyant member has a flexible wall which is highly sensitive to the actuating force of the thermosensitive medium contained within said member.

Another object of this invention is to provide a device of the type characterized which employs a minimum number of soldered or brazed joints; also one that is composed of a minimum number of simple parts that are easy to manufacture and assemble; also one that is compact in structure and highly efficient in operation.

Another object of this invention is to provide a method of manufacturing buoyant members of the type characterized which employs relatively few and relatively simple steps, so that the device may be inexpensively manufactured in large quantities without the use of costly machinery or highly skilled labor.

Another object of this invention is to provide a method of manufacturing a device of the type characterized whereby said buoyant member may comprise a lateral integral wall which has been rendered highly flexible. Another object of this invention is to provide a method of manufacturing a device of the type characterized which comprises a lateral integral wall so shaped as to afford relatively great buoyancy for the space which the device occupies. Other objects will appear as the description of the invention proceeds.

Stated broadly, the invention comprises a combined thermostat and float, particularly for use in an air valve, composed of a closed hollow buoyant member having a flexible lateral wall and charged with a thermosensitive medium, preferably a volatile fluid. The flexibility of said lateral wall is preferably afforded by providing said wall with a plurality of flexible corrugations which extend for only a portion of the length of said lateral wall, and the uncorrugated portion of said wall is preferably enlarged so that its cross-section is at least equal to the approximate maximum cross-section of said corrugated portion. The invention also comprises the method of manufacturing a buoyant member of this character so that the corrugated and uncorrugated portions of its lateral wall may be formed integrally from one tubular piece of material, and the enlargement of the uncorrugated portion, if desired, and also the forming of the corrugations, may be readily effected by interior radial pressure, aided preferably by a longitudinal force of compression.

The invention is capable of receiving a variety of mechanical expressions and being carried out in a variety of ways, some of which are shown on the accompanying drawings, but it is to be expressly understood that the drawings are for purposes of illustration only and are not to be construed as a definition of the limits of the invention, reference being had to the appended claims for that purpose.

Referring in detail to said drawings:—

Fig. 1 is an axial section of an air valve suitable for application to a steam radiator and embodying the present invention;

Fig. 2 is an axial section on a somewhat reduced scale of another air valve also embodying the present invention and illustrating the combined float and thermostat in expanded condition; and Figs. 3, 4, and 5, are somewhat diagrammatic axial sections of suitable apparatus for carrying out the method of this invention and illustrating successive steps in the performance of said method.

In the form shown in Fig. 1, the valve casing 10, of any suitable form and construction, is provided with inlet and outlet connections, 11 and 12 respectively, threaded for attachment to a radiator or other suitable device. Said casing adjacent the top thereof is provided with an air vent 13, shown as an axial aperture formed in a threaded plug 14 which is received, and preferably soldered, within a threaded aperture in the top of said casing. A cap 15 of any suitable construction, through the wall of which extends one or more apertures 16, may be mounted on the casing 10 over the vent 13, if desired, for purposes of appearance and protection. The axial aperture constituting the vent 13 is shown as enlarged at its lower end 17 and provided with a conical seat 18 intermediate its sections of different diameter, whereby there is provided a valve seat for the valve member to be described.

The threaded plug 14 may also carry, if desired, a baffle or deflector plate 19 adjacent its lower end.

The valve member 20, in the form shown, is composed of an elongated stem or rod having a conical end 21 for coaction with the conical seat 18, and provided adjacent its lower end with a flange or collar 22 by which said valve member may be secured in any suitable way, as by soldering or brazing, to the top of the combined float and thermostat 23.

Said combined float and thermostat, in the form shown in Fig. 1, comprises a tubular wall 24, of any suitable material but preferably of a resilient metal, closed at its upper end by a convex wall 25 integral therewith, and formed at its opposite end into a plurality of flexible corrugations 26. At its lower end, a rigid end wall 27, of any suitable form and construction, is suitably connected to the end corrugation, as by soldering or brazing. In the preferred embodiment of this invention, the uncorrugated portion of the lateral wall is relatively long as compared to the corrugated portion and at least as large in cross section as the maximum cross section through the corrugated portion, so that the corrugated portion of said lateral wall is approximately contained within the cylindrical surface defined by the uncorrugated portion of said wall; if desired, however, said uncorrugated portion may be made of even greater cross section than the maximum cross section through the corrugated portion.

The hollow closed member thus provided is preferably supplied with means to limit the extent to which said member may be contracted and, as said member is also preferably provided with a tube for introducing a thermosensitive medium into the interior thereof, said filling tube is preferably elongated to provide a stop for the contraction of said hollow member. In the form shown, a filling tube 28 is brazed or otherwise suitably secured in an aperture 29 provided in the end wall 27 and extends to a free end 30 in position to engage the end wall 25 of the hollow member and limit the contraction of said member. Said tube is also preferably provided with a vent opening 28' to permit the escape of air when the hollow member is being charged with thermosensitive medium.

Said closed hollow member is charged with a thermosensitive medium preferably a small quantity of a volatile liquid having a boiling point at or adjacent to the temperature of steam, said thermosensitive medium being introduced through the filling tube 28 after which said tube is sealed by a plug 31 of any suitable material preferably soldered in the outer end of said tube.

The lower wall of the casing 10 is shown as provided with an upstanding and transversely slotted rib or projection 32 upon which the combined thermostat and float is normally seated and, if desired, a centering plate or spider 33, shaped to conform generally with the interior cross-section of the casing 10 and preferably provided with apertures 33', may be soldered or otherwise suitably attached to the end wall 27 of the combined float and thermostat to constitute a centering device for the lower end thereof.

In practice, the inlet 11 of the casing 10 is suitably connected to the upper portion of a radiator and the outlet 12 is suitably connected to a lower portion of said radiator. When steam is first turned into the radiator, the air is displaced thereby and may flow into the casing 10 and escape through the vent 13, the valve member 20 being spaced from the port 18 because the combined thermostat and float 23 is then in contracted position and seated on the projection 32. As soon as the air is driven out of the radiator, the steam flows into the casing 10 through the inlet 11 and is deflected downwardly into the lower portion thereof by the baffle or deflector plate 19. The temperature of this steam promptly increases the vapor tension of the volatile fluid confined within the hollow closed member 23, and said member expands owing to the flexibility of its lateral wall afforded by the corrugations 26 and engages the conical end 21 of the valve member 20 with the conical seat 18 in the air vent 13 to prevent the escape of steam. This action is effected promptly owing to the sensitive response of the vapor tension of a volatile liquid to temperature changes and to the relatively great flexibility afforded by the relatively deep corrugations 26. Valve member 20 will then be held in engagement with the seat 18 and prevent the escape of steam as long as steam enters the valve casing 10. If, on the other hand, water enters said valve casing 10, as occurs for example when a radiator becomes "water-logged," the escape of water through the vent 13 is prevented because the hollow buoyant member 23 rises with the water until the conical end 21 of the valve member engages the seat 18, and will remain in this position as long as the water remains in the casing 10. This action is insured by the relatively large buoyancy afforded by a closed hollow member of the form and capacity provided by the present invention. In this elevated position of the combined float and thermostat, the aperture through the outlet 12 is wide open so as to permit the water to drain back into the system at the first opportunity. When the temperature in the interior of the casing 10 is reduced below that of the steam, the vapor tension of the volatile fluid in the combined float and thermostat 23 is correspondingly reduced, and said member 23 may contract, owing to the resiliency inherent in the flexible corrugations when the wall is made of resilient material, until the end wall 25 engages the stop afforded by the free end 30 of the tube 28. The conical end 21 of the valve member is thereby withdrawn from the valve seat 18 if the casing 10 is also substantially free of water, so as to permit the passage of air through the vent 13.

In the form shown in Figure 2, the valve casing 10 is provided with an inlet connection 40 at its lower end and the outlet connection is afforded by a long curved tube 41 which is smaller than the inlet 40 so as to provide a free passage for the air, steam and water through the annular space surrounding said tube 41. Said tube may be mounted in any suitable way, as by securing the same in a boss 42 extending upwardly within the lower end of the casing, and projects downwardly into the radiator or connections for a suitable distance to insure that the water will drain from the casing. In this form of the invention, said boss 42 is shown as provided with a recess 43 which coacts with the outwardly projecting end of the filling tube 28 to center the combined float and thermostat within the casing 10, said boss also constituting a seat for said combined float and thermostat when the casing is substantially free from water. Otherwise the construction of Fig. 2 is substantially the same as that illustrated in Fig. 1, corresponding parts being indicated by the same reference characters.

In manufacturing said combined float and thermostat, I preferably make the lateral wall of the buoyant member, including both the corrugated and the uncorrugated portions thereof, from a single piece of integral tubular material, and also preferably form one end wall of said member integrally with said lateral wall, by subjecting a tubular blank interiorly to radial pressure and also, preferably, to a simultaneous longitudinal force of compression. A suitable apparatus for carrying out this method with the use of hydrostatic pressure is illustrated diagrammatically in Figs. 3 to 5, wherein 50 designates a form or die providing an elongated recess having a plurality of corrugations 51 and an enlarged uncorrugated cylindrical section 52. Said form may be made in two or more sections retained in position by rings 70 driven onto the tapered exterior of said sections and locked in alignment by one or more transverse pins 71. Within said enlargement 52 works a head 53 shaped at its inner face 54 to conform with the shape to be given the end wall of the buoyant member heretofore described. Said head 53 may be moved axially in said enlargement 52 in any suitable way, as by a threaded spindle 55 working in a nut 56 and provided with a suitable operating wheel 57. A suitable plunger 58 is mounted to reciprocate within the aforesaid recess provided by the form or die 50, and carries at its inner end a cup leather 59 for engagement with the interior of a tubular blank 60 having an integral end wall 61, which is to be shaped within said form. Said plunger 58 is shown as provided with a passage 62 extending through its inner end and communicating with piping 63 leading from any suitable source of hydrostatic pressure. Said plunger is also provided with a plurality of transverse apertures 64 designed to receive a pin 65 which constitutes an abutment for said plunger by coaction with the frame 66 of the apparatus.

In conformity with the preferred procedure of this invention, the tubular blank 60 is positioned in the form or die 50 with its end wall 61 in engagement with the convex face 54 of the head 53, as illustrated in Fig. 3. Hydrostatic pressure is then admitted to the space within the blank between its end wall 61 and the end of the plunger, and said blank is forced outwardly or expanded so as to assume the shape of the cavity between the convex face 54 of the head 53 and the end of the enlargement 52, as illustrated in Fig. 4. The head 53 is then withdrawn a short distance, as by manipulation of the wheel 57 and threaded stem 55, and the blank is advanced a corresponding distance into the form in any suitable way, as by the action of hydrostatic pressure on the end wall thereof, to the position shown in Fig. 4. Hydrostatic pressure is again admitted to the space between the end wall 61 and the end of the plunger and, to aid the expansion of the blank without unduly stressing the material, wheel 57 is preferably manipulated simultaneously to move the head 53 toward said blank and exert a longitudinal force of compression on said blank. By the combined action of the radial pressure and longitudinal force of compression, the section of the tubular blank projecting into the enlargement 52 is forced outwardly or expanded to the shape of the space between the head and the plunger, as illustrated in Fig. 5. The head 53 is then moved rearwardly another short distance, the blank again advanced until it engages said head, and the tubular blank is again expanded by the radial action of hydrostatic pressure and the longitudinal force of compression. This is repeated successively until said tubular wall is enlarged to the desired portion of its length.

If the change in cross section of the tubular blank is relatively large, said enlargement may be effected progressively by successive treatments of the blank in forms having enlargements of progressively increasing cross section and, if desired, said wall may be annealed between each successive treatment thereof to remove more or less of the effects of cold working.

The blank with its enlarged portion may then be removed from the form and corrugations provided in the unenlarged portion of the blank in any suitable way, but I preferably form the corrugations, or at least the initial corrugations, in the blank before it is removed from the form or die. This is accomplished in the apparatus illustrated by successively withdrawing the plunger 58 within the blank 60 so as to uncover successively the sections of said blank opposite the successive corrugations in the wall of the form, and then introducing hydrostatic pressure to the interior of the blank to force the succeeding sections of said blank into the successive corrugations of said form. In carrying out this part of the method the pin 65 is introduced into the successive holes 64 to properly position the plunger 58 in its successive positions to uncover the successive corrugations of the form. This part of the method may be carried out in conformity with the method disclosed and claimed in the patent of Weston M. Fulton and myself, No. 1,522,051, dated January 6, 1925, and entitled Corrugated walls and methods of making the same, to which reference is made for a more detailed explanation of the preferred process of forming corrugations in a tubular blank by the action of hydrostatic pressure and, if desired, the simultaneous action of a longitudinal force of compression. After the blank is removed from the form the corrugations may be subjected to one or more rolling operations or other suitable treatment, if desired, to deepen and narrow the corrugations or otherwise suitably impart increased flexibility to the corrugated portion of the wall.

It will therefore be perceived that a combined float and thermostat has been provided in which the flexibility for expansion and contraction of a hollow buoyant member is afforded in the lateral wall of said member, so that the use of a flexible diaphragm has been avoided, the necessity for flexure at a soldered or brazed joint eliminated, and the danger of premature rupture and leakage overcome. At the same time, a combined float and thermostat has been provided in which the buoyant member is possessed of relatively great flexibility so that it may be readily expanded and contracted to effect the purpose for which it is designed. Furthermore, by providing an uncorrugated portion which is at least as large in cross section as the maximum cross section through the corrugated portion, said hollow member is possessed of relatively great buoyancy because of its large interior capacity; and, inasmuch as the interior of the valve casing must be made at least as large as the outside diameter of the corrugations, said hollow member affords a maximum buoyancy for the space which it must occupy. Additionally, the loss of buoyancy incident to the increase in weight necessarily accompanying the application of solder to a plurality of joints has been avoided.

At the same time, it will be perceived that a method of manufacturing a buoyant member of this character has been provided whereby the lateral wall with its flexible corrugations and its enlarged uncorrugated portion, and also one end wall if desired, may be made integrally from a one-piece tubular blank by a minimum number of simple operations. Moreover, a method of manufacturing said member has been provided whereby the tubular blank may be enlarged without danger of rupture or undue stressing of the material—as might occur if the enlargement were effected by the action of hydrostatic pressure alone—and also a method by which the enlargement of the blank and the forming of corrugations in the unenlarged portion thereof may be successively and readily effected in a single apparatus.

While the embodiments of the invention illustrated on the drawings have been described with considerable particularity it is to be expressly understood that the invention is not limited thereto, as the invention is capable of being embodied or carried out in a variety of ways, some of which will now readily suggest themselves to those skilled in the art, while changes may be made in the sizes, portions and details of construction and procedure without departing from the spirit of this invention. While the corrugated portion of the combined float and thermostat has been shown as positioned at the lower end thereof, such is not essential, as the device would still be possessed of marked utility if it were inverted and the valve member attached to the corrugated end, or if the corrugations were disposed intermediate the ends of the lateral wall. The apparatus illustrated for carrying out the method of this invention may also be modified in many respects, and rendered automatic if desired, while the interior force of enlargement and the longitudinal force of compression may be obtained simultaneously from a common source of power without departing from the spirit of this invention. Reference is therefore to be had to the claims hereto appended for a definition of the limits of said invention.

What I claim is:—

1. In the method of manufacturing a hollow buoyant member, subjecting a tubular wall having a closed end to interior hydrostatic pressure to enlarge said wall for a portion of its length adjacent said closed end, and forming corrugations in the unenlarged portion of said wall.

2. In the method of manufacturing a hollow buoyant member subjecting a tubular wall to interior hydrostatic pressure for a portion of its length to provide an enlarged uncorrugated portion, and forming corrugations in the unenlarged portion of said wall.

3. In the method of manufacturing a hollow buoyant member, subjecting a tubular wall interiorly and successively to hydrostatic pressure for a portion of its length to provide an enlarged cylindrical portion, and forming corrugations in the unenlarged portion of said wall.

4. In the method of manufacturing a hollow buoyant member, subjecting successive sections of a tubular wall interiorly to hydrostatic pressure to provide an enlarged uncorrugated portion, and forming corrugations in the unenlarged portion of said wall.

5. In the method of manufacturing a hollow buoyant member, subjecting a tubular wall having a closed end simultaneously to interior hydrostatic pressure and a longitudinal force of compression to enlarge said wall for a portion of its length, and forming corrugations in the unenlarged portion of said wall.

6. In the method of manufacturing a hollow buoyant member, subjecting a tubular wall having a closed end successively to simultaneous applications of interior hydrostatic pressure and a longitudinal force of compression to enlarge said wall for a portion of its length by progressive increments, and forming corrugations in the unenlarged portion of said wall.

7. In the method of manufacturing a hollow buoyant member, subjecting successive sections of a tubular wall to simultaneous applications of interior hydrostatic pressure and a longitudinal force of compression to provide an enlarged uncorrugated portion, and forming corrugations in the unenlarged portion of said wall.

8. In the method of manufacturing a hollow buoyant member, subjecting a tubular wall having a closed end interiorly to hydrostatic pressure to enlarge the same for a portion of its length, and forming corrugations by hydrostatic pressure in the unenlarged portion of said wall.

9. In the method of manufacturing a hollow buoyant member, subjecting a tubular wall simultaneously to interior hydrostatic pressure and a longitudinal force of compression to provide an enlarged cylindrical portion, and forming corrugations by hydrostatic pressure in the unenlarged portion of said wall.

10. In the method of manufacturing a hollow buoyant member, subjecting a tubular wall having a closed end to pressure to enlarge the same for a portion of its length, confining said pressure to the portion of the wall to be enlarged, and forming corrugations in the unenlarged portion of said wall.

11. In the method of manufacturing a hollow buoyant member, subjecting a tubular wall to pressure to provide an enlarged uncorrugated portion and forming in the unenlarged portion of said wall corrugations which are not substantially larger in outside diameter than the diameter of said enlarged portion.

12. In the method of manufacturing a hollow buoyant member, positioning a tubular wall having a closed end in a form having a region of enlarged cross section, enlarging a portion of said wall by expanding the same into said region of enlarged cross section, and forming corrugations in the unenlarged portion of said wall.

13. In the method of manufacturing a hollow buoyant member, positioning a tubular wall having a closed end in a form having a region of enlarged cross section, enlarging successive portions of said wall by expanding the same into said region of enlarged cross section until said wall is enlarged for the desired portion of its length, and forming corrugations in the unenlarged portion of said wall.

14. In the method of manufacturing a hollow buoyant member, positioning a tubular wall in a form having a region of enlarged cross section, subjecting said wall simultaneously to interior radial pressure and a longitudinal force of compression to expand a portion of said wall into said region of enlarged cross section and to provide an enlarged uncorrugated portion, and forming corrugations in the unenlarged portion of said wall.

15. In the method of manufacturing a hollow buoyant member, positioning a tubular wall having a closed end in a form having a region of enlarged cross section, subjecting successive portions of said wall simultaneously to an interior radial pressure and a longitudinal force of compression to expand the same into said region of enlarged cross section until said wall is enlarged for the desired portion of its length, and forming corrugations in the unenlarged portion of said wall.

16. In the method of manufacturing a hollow buoyant member, positioning a tubular wall in a corrugated form having an uncorrugated region of enlarged cross section, expanding a portion of said wall by hydrostatic pressure into said region of enlarged cross section, and then successively forcing said wall by hydrostatic pressure into the successive corrugations of said form.

17. In the method of manufacturing a hollow buoyant member, positioning a tubular wall in a corrugated form having an uncorrugated region of enlarged cross section, simultaneously subjecting said wall to interior hydrostatic pressure and a longitudinal force of compression to expand a portion of said wall into said region of enlarged cross section, and then successively subjecting the sections of said wall opposite the successive corrugations in said form to said interior hydrostatic pressure to form corrugations in the unenlarged portion of said wall.

18. In the method of manufacturing a hollow buoyant member, positioning a tubular wall in a corrugated form having an uncorrugated region of enlarged cross section, and successively subjecting said wall to the combined action of interior hydrostatic pressure and a longitudinal force of compression to expand successive portions of said wall into said region of enlarged cross section and the successive corrugations of said form.

19. In the method of manufacturing a combined float and thermostat, subjecting a tubular wall to pressure to enlarge its cross section for a portion of its length, forming corrugations in the unenlarged portion of said wall, closing the open end or ends of said wall to form a closed hollow member, and sealing a thermosensitive medium in said hollow member.

20. In the method of manufacturing a combined float and thermostat for an air valve, subjecting a tubular wall to pressure to enlarge the same in cross section for a portion of its length, forming corrugations in the unenlarged portion of said wall, closing the open end or ends of said wall to form a closed hollow member, sealing a thermosensitive medium in said hollow member, and attaching a valve member to one end of said hollow member.

In testimony whereof I have signed this specification.

JEAN V. GIESLER.